United States Patent
Fourcade et al.

(10) Patent No.: US 8,147,724 B2
(45) Date of Patent: Apr. 3, 2012

(54) TIN OXIDE-BASED ELECTRODE COMPOSITION

(75) Inventors: Julien P. Fourcade, Shrewsbury, MA (US); Olivier Citti, Wellesley, MA (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 285 days.

(21) Appl. No.: 12/642,274

(22) Filed: Dec. 18, 2009

(65) Prior Publication Data
US 2010/0155674 A1    Jun. 24, 2010

Related U.S. Application Data

(60) Provisional application No. 61/138,862, filed on Dec. 18, 2008.

(51) Int. Cl.
*H01B 1/08* (2006.01)
*H01B 5/14* (2006.01)

(52) U.S. Cl. .................. 252/520.1; 252/519.5

(58) Field of Classification Search .. 252/519.5–519.51, 252/520.1; 428/929; 373/36
See application file for complete search history.

(56) References Cited

U.S. PATENT DOCUMENTS

| | | | |
|---|---|---|---|
| 3,287,284 A | 11/1966 | Norman | |
| 3,502,597 A | 3/1970 | Bush | |
| 4,110,545 A | 8/1978 | Shaw et al. | |
| 4,897,853 A | 1/1990 | Argent | |
| 5,163,220 A | 11/1992 | Zeto et al. | |
| 6,296,539 B1 | 10/2001 | Awaji et al. | |
| 7,685,843 B2 * | 3/2010 | Citti et al. | 65/374.13 |
| 2006/0016223 A1 | 1/2006 | Citti et al. | |
| 2006/0261317 A1 | 11/2006 | Citti et al. | |
| 2007/0215456 A1 | 9/2007 | Abe et al. | |
| 2010/0276688 A1 * | 11/2010 | Yano et al. | 257/43 |

FOREIGN PATENT DOCUMENTS

| | | |
|---|---|---|
| EP | 0505750 A2 | 9/1992 |
| EP | 01312592 B1 | 6/2006 |
| JP | 55-121208 A | 9/1980 |
| SU | 833830 A1 | 5/1981 |
| WO | 2006012485 A2 | 2/2006 |

OTHER PUBLICATIONS

International Search Report from No. PCT/US2009/068783, (Aug. 9, 2010).

* cited by examiner

*Primary Examiner* — Mark Kopec
(74) *Attorney, Agent, or Firm* — Abel Law Group, LLP

(57) ABSTRACT

A tin oxide-based electrode formed from a composition including a majority component comprising tin-oxide ($SnO_2$), and additives comprising CuO, ZnO, and a resistivity modifying species. The total amount of CuO and ZnO is not greater than about 0.3 wt %, and the ZnO is present in an amount within a range between about 0.1 wt % and about 0.19 wt %.

20 Claims, 4 Drawing Sheets

TIN OXIDE-BASED ELECTRODE COMPOSITION

CROSS-REFERENCE TO RELATED APPLICATION(S)

The present application claims priority from U.S. Provisional Patent Application No. 61/138,862, filed Dec. 18, 2008, entitled "Tin Oxide-Based Electrode Composition," naming inventors Julien P. Fourcade and Oliver Citti, which application is incorporated by reference herein in its entirety.

BACKGROUND

1. Field of the Disclosure

The following is generally directed to tin oxide-based electrodes, and particularly compositions for forming industrial electrodes for use in glass melting applications.

2. Description of the Related Art

Commercial glass melting operations typically rely upon use of fossil fuels such as natural gas or oil. The use of electric energy is also possible either as an additional source of energy, as the main source of energy, or the sole source of energy as in an electric furnace. In the latter case, electric furnaces make use of refractory electrodes whose very high electrical conductivity allows direct heating of the glass by passing the current between electrodes directly through the glass. Such electrodes have been fairly well studied in the art. However, with the development of new technologies and increasing demand for high performance glass components, such as for utilization in flat displays including LCD and plasma displays, increasing demands have been placed upon the mechanical and optical performance of glasses, and in turn the performance of glass melting equipment.

In the context of electric furnacing operations, use has been made of various tin oxide-based electrode compositions, such as those detailed in U.S. Pat. No. 3,287,284 (commonly owned by the present assignee). While the technology described in U.S. Pat. No. 3,287,284 is decades old, development of new tin oxide electrode materials has been incremental, common of mature art areas, and U.S. Pat. No. 3,287,284 represents important state-of-the-art materials. As described, the tin oxide-based compositions include various components that assist in densification or resistivity. Among the various additives described, U.S. Pat. No. 3,287,284 utilizes a combination of copper oxide, zinc oxide, and antimony oxide. The components are on the one hand described in fairly broad compositional ranges, namely 0.1 to 0.5% copper oxide, 0.5 to 1.0% zinc oxide, and 0.7 to 1.2% antimony oxide, but on the other, actually only reduced to practice within fairly narrow ranges.

However, the composition disclosed in '284 was discovered to have low thermal stability and unstable firing shrinkage that made forming industrial grade (i.e., large sized) electrodes difficult. Accordingly, as disclosed in USSR Patent 833,830 the percentages of some additives were changed to include 0.05 to 0.2% CuO, 0.2 to 1.55% ZnO, 0.25 to 1.75% $Sb_2O_3$ to combat the thermal instability of the '284 composition. However, this composition was discovered to produce electrodes having unsuitable (high) electrical resistivities. Further modifications to the tin oxide-based compositions have been slow and have focused on balanced ratios of the additives in an attempt to reduce the undesirable effects. See, for example U.S. 2006/0261317 and U.S. 2006/0016223.

While certain working compositions described in the above noted disclosures have desirable properties, a need continues to exist in the art for improved tin oxide-based electrodes, such as those having improved stable electrical properties, density, thermal stability, corrosion resistance, and formability.

SUMMARY

According to a first aspect, a tin oxide-based electrode is formed from a composition including a majority component comprising tin-oxide ($SnO_2$), and additives comprising CuO, ZnO, and a resistivity modifying species. The total amount of CuO and ZnO is not greater than about 0.4 wt %, and wherein the ZnO is present in an amount within a range between about 0.1 wt % and about 0.19 wt %.

In another aspect, a tin oxide-based electrode is formed from a composition including a majority component comprising tin-oxide ($SnO_2$). Additives are added to the composition including not greater than about 0.2 wt % CuO, ZnO within a range between about 0.1 wt % and about 0.19 wt %, and a resistivity modifying species within a range between about 0.5 wt % and about 1.5 wt %.

In still another aspect, an electrode includes a tin oxide-based body having a rectangular contour and being free of macroscopic internal cracks. The electrode is formed from a composition including a majority component including tin-oxide ($SnO_2$), and additives comprising CuO, ZnO, and a resistivity modifying species. The CuO is present in an amount of less than about 0.2 wt % and the ZnO is present in an amount within a range between about 0.1 wt % and about 0.19 wt %.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
FIGS. 1-4 include photographs of cross-sections of industrial-sized sintered blocks for forming electrodes having macroscopic internal cracks formed from conventional tin oxide based compositions.
Figure 2:
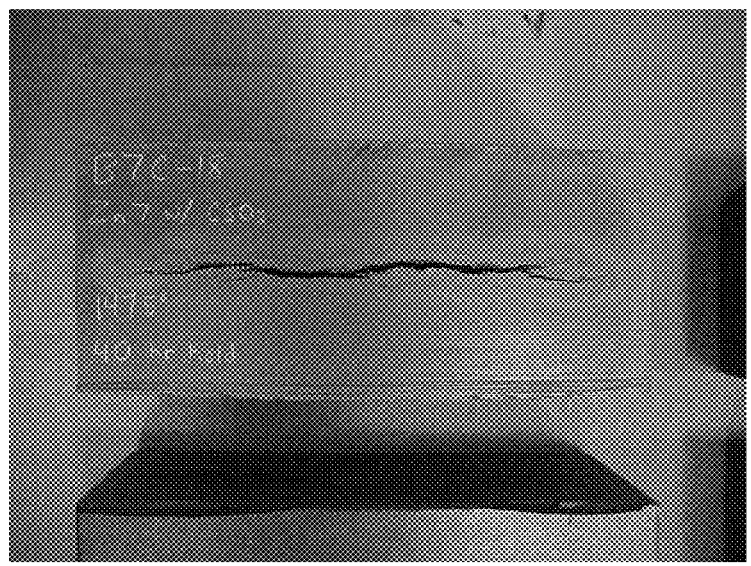
Figure 3:
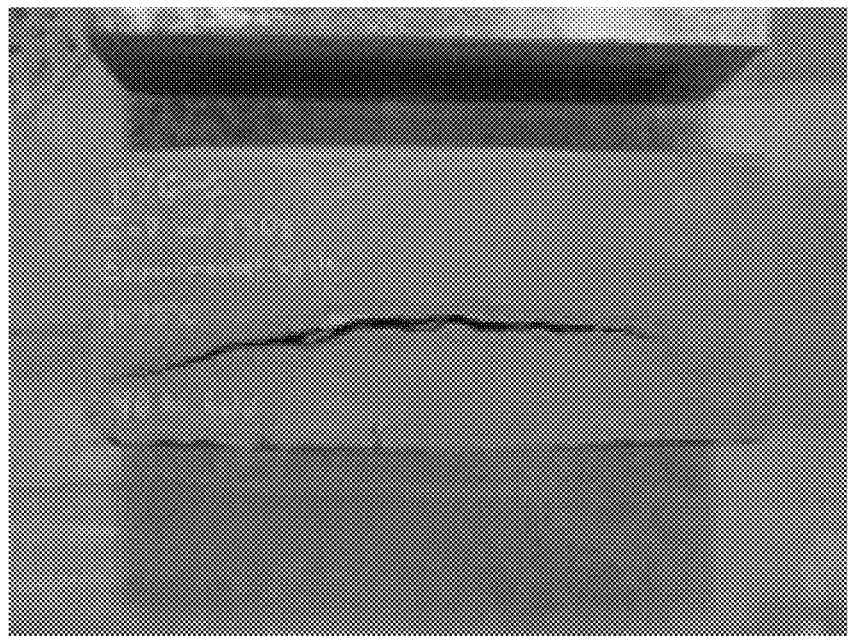
Figure 4:
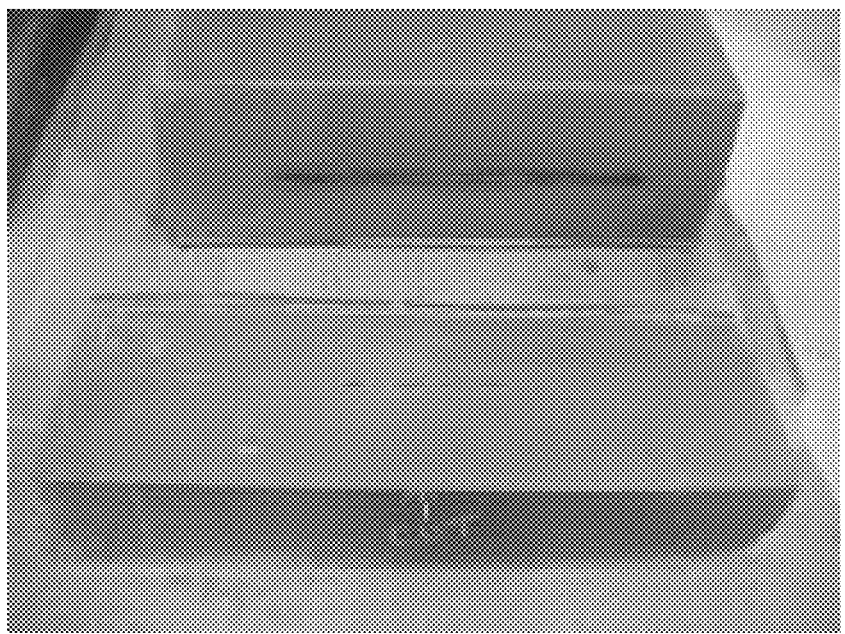

The following is directed to tin oxide-based electrodes for use in commercial glass melting furnaces, and particularly furnaces used to produce LCD quality glass materials. As such, the following tin oxide-based compositions are particularly suited for forming large, industrial-grade electrodes.

As indicated, the following compositions are tin oxide-based incorporating tin oxide as a major component. Reference herein to use of tin oxide as a major component includes at least about 50 wt % tin oxide. In fact, the amount of tin oxide used in the following compositions is generally not less than about 95 wt %, and particularly within a range between about 90 wt % and about 98 wt %.

The tin oxide portion of the composition can include different kinds of tin oxide, such as virgin tin oxide powder, calcined tin oxide powder (i.e., grog or roasted tin oxide powder) or a combination thereof. When using a combination of virgin and roasted tin oxide, embodiments herein typically use a greater percentage of virgin tin oxide powder than roasted tin oxide powder. For example, certain embodiments use an amount of virgin tin oxide powder of at least about 50 wt % of the total amount of tin oxide powder. In other instances the composition may use a greater amount of virgin material, such as at least about 60 wt %, at least about 65 wt %, and particularly within a range between about 60 wt % and 75 wt % virgin tin oxide powder. Accordingly, the amount of calcined tin oxide is on the order of not less than about 5 wt %, not less than about 10 wt %, such as within a range between about 5 wt % and 20 wt %, and more particularly within a range between about 10 wt % and about 15 wt %.

In addition to the tin oxide component, the composition for forming the tin oxide-based electrode can include additives. It will be appreciated that calcined tin oxide can include other oxide components, however, for the purposes of the compositions herein, the presence of other oxide species beside tin oxide within the calcined tin oxide component are not considered as additives. Certain additives have the capability to alter the electrical characteristics of the final-formed electrode, or improve the formability by acting as sintering aids or densification aids, and some species can improve corrosion resistance. One or more of such additives can be added to the composition for such effects in the formed electrode body.

According to one embodiment, the composition can include a particular amount of copper oxide (CuO). Generally, copper oxide is added as a sintering aid to facilitate the formation of the final-formed and fully densified electrode body. However in high temperature processing, copper oxide has a tendency to undergo a reduction reaction, producing pure copper metal and other forms of copper oxide (e.g., $Cu_2O$), which can ultimately result in corrosion and failure of the electrode. As such, the amount of copper oxide within the composition is generally limited to amounts of not greater than about 0.2 wt %. In other embodiments the amount of copper oxide is less, such as not greater than about 0.15 wt %, such that it may be within a range between about 0.05 wt % to about 0.2 wt % and more particularly within a range between about 0.8 wt % and about 0.12 wt %. Particular embodiments herein use 0.1 wt % copper oxide.

The composition can also include certain amounts of zinc oxide (ZnO). Like copper oxide, zinc oxide can be added to the composition to facilitate sintering and densification of the body during forming. In fact, it has been suggested in the art that zinc oxide is a preferred substitute for copper oxide and a suitable additive for reducing the total amount of copper oxide within the final-formed electrode to reduce corrosion and failure. As a sintering aid, zinc oxide has not previously been attributed to any failure mechanisms within the final-formed electrode body at high temperatures. However, the Inventors have discovered that certain amounts of zinc oxide, even those as low as 0.25 wt % within the composition, can have deleterious effects on the final-formed electrode body that can result in macroscopic internal cracks, which provide a preferred pathway for molten glass into the body of the electrode leading to corrosion of the electrode body and diminishing the properties of the electrode body. As such, the amount of zinc oxide within the composition is generally limited to a range between about 0.1 wt % and about 0.19 wt %. In other embodiments, this range may be more limited, such that the amount of zinc oxide is within a range between about 0.11 wt % and about 0.19 wt % or even within a range between about 0.15 wt % and 0.19 wt %. Certain embodiments utilize an amount of zinc oxide between about 0.11 and about 0.18 wt % or even in a narrower range such as between about 0.13 wt % and 0.18 wt %. According to one particular embodiment, the composition to form the final tin oxide-based electrode body comprises an amount of zinc oxide of 0.17 wt %.

The total amount of copper oxide and zinc oxide additives may be balanced in the ranges above to reduce negative high temperature effects within the final-formed electrode body. Generally, the amount of zinc oxide is greater than the amount of copper oxide within the composition used to form the electrode body. In particular, the total amount of copper oxide and zinc oxide is not greater than about 0.4 wt %, such as not greater than about 0.35 wt %, 0.3 wt %, 0.29 wt %, or even than not greater than about 0.27 wt %. In accordance with one embodiment, the total amount of copper oxide and zinc oxide is within a range between about 0.15 wt % and 0.3 wt %, and more particularly, within a range between about 0.2 wt % and about 0.29 wt %.

The composition can include resistivity modifying species to affect the electrical resistivity of the final-formed electrode body. According to one embodiment, suitable resistivity modifying species include $Sb_2O_3$, $As_2O_3$, $Nb_2O_5$, $Bi_2O_3$, and $Ta_2O_5$, and combinations thereof. In accordance with a particular embodiment, the compositions herein are particularly suited for use with $Sb_2O_3$.

Generally, the composition contains a minor amount of a resistivity modifying species such that the total amount of these species is not greater than about 2 wt %. In fact, in certain instances, the amount of the resistivity modifying species is not greater than about 1.75 wt %, not greater than about 1.5 wt %, and particularly within a range between about 0.5 wt % and 1.5 wt %. In one exemplary embodiment, the amount of resistivity in modifying species is within a range between 0.8 wt % and 1.2 wt % such that it is about 1 wt %. Such amounts are particularly suitable for use with $Sb_2O_3$.

Other additives that may be provided in the composition to form the electrode body are corrosion inhibiting species, which improve the resistance of the electrode body to chemical attack by melted glass compositions at high temperatures. Some suitable corrosion inhibiting species include oxides such as $ZrO_2$ and $HfO_2$. The addition of such corrosion inhibiting species to the compositions herein are generally not greater than about 3 wt % of the total weight of the composition. In certain embodiments, the composition can include not greater than about 2.5 wt %, such as not greater than about 2 wt %, or even not greater than about 1.5 wt % of a corrosion inhibiting species. Certain compositions herein include an amount of a corrosion inhibiting species within a range between about 1 wt % and about 3 wt %, between about 1 wt % and about 2.5 wt %, and more particularly, between about 1.25 wt % and about 2.5 wt %.

The total amount of additives within the composition to form the final-formed electrode body is typically not greater than about 5 wt %, and more typically not greater than about 4 wt %, such as about 3.8 wt % Certain embodiments utilize a total amount of additives within a range between about 3 wt % and about 4 wt %.

After combining the additives with the tin oxide, the electrode body can be formed by a process which includes mixing the composition of raw materials. The forming process typically requires high densification through sintering and thus the raw materials are energetically blended until a homogeneous mixture is reached. The mixture is then molded, which can include reduced pressure conditions initially followed by high pressure isostatic pressing to form green compact bodies. After pressing and forming, the green bodies can be fired at temperatures of a least about 1400° C. until a substantially densified and sintered ceramic body is obtained. In order to form electrodes from the molded bodies, which are typically in the form of blocks, the blocks are machined to the desired dimensions of the electrode. It will be appreciated that while molding is a method described herein, other forming processes such as casting can be used. Additionally, the forming process can include a combination of processes such as casting and pressing.

The final-formed electrodes typically have large volumes suitable for use in industrial-sized glass melting applications. As such, the final-formed electrode bodies can have volumes larger than about 10 cm$^3$, such as larger than about 20 cm$^3$, at least about 30 cm$^3$, or even at least about 40 cm$^3$. In certain instances, the volume of the final-formed electrode body is within a range between about 30 cm$^3$ and about 50 cm$^3$.

Additionally, certain embodiments utilize electrodes having generally rectangular shapes, and may include bodies having square cross-sectional contours. In some instances, the electrodes have other polygonal cross-sectional contours having more than four sides present in the rectangular shapes. Such shapes typically include pentagonal, hexagonal, heptagonal, or octagonal cross-sectional contours having more than four sides. While in other instances, the electrodes can be cylindrical such that the bodies have a circular, oval, or elliptical cross-sectional contour.

Notably, large, industrial-sized electrodes pose certain processing obstacles since it is highly desirable to form fully densified bodies, but such large volume ceramic bodies are subject to significant internal temperature gradients during forming. Temperature gradients that can cause cracking either during the forming process or during operation from the thermal cycling, which results in lower corrosion resistance and changes in electrical resistivity characteristics.

The resulting tin oxide-based electrodes according to embodiments of the present invention are found to have particularly desirable properties. For example, the composition described herein yielded electrodes having densities of at least about 85% of the theoretical density of tin oxide. In fact, some electrodes demonstrated greater density such as at least about 87% at least about 90%, at least about 93%, or even at least about 96% of the theoretical density of tin oxide. Certain embodiments have a theoretical density within a range between about 90% and about 98%, and more particularly within a range between about 90% and about 96% of the theoretical density of tin oxide.

The apparent porosity of the final-formed electrodes can be particularly low, such as less than about 3 vol %, or even less than about 2 vol %. In fact, certain electrodes demonstrated apparent porosities as low as about 1 vol %, and particularly within a range between about 0.1 vol % and about 2 vol %. The density and apparent porosity of the final-formed electrodes noted above is unexpected to the Inventors given the reduced amount of sintering aids (i.e. CuO and ZnO).

Moreover, the electrical resistivity of the final-formed electrodes was found to be suitable for use as electrodes. That is, the final-formed electrodes had electrical resistivities of not greater than about 0.1 Ω-cm at temperatures greater than about 100° C. Other embodiments had lower electrical resistivities such as not greater than about 0.07 Ω-cm, or not greater than about 0.05 Ω-cm at temperatures greater than about 100° C. And in fact, the compositions described herein were capable of forming electrodes having electrical resistivities comparable to those of prior art compositions. In particular, having electrical resistivities of less than 0.01 Ω-cm at temperatures in excess of 700° C.

Moreover, the Inventors have discovered that the presently disclosed compositions are capable of forming fully densified large industrial-sized electrodes. It was discovered first hand that certain compositions when scaled to form industrial-sized products were producing bodies with macroscopic internal cracks. That is, cracks within the interior of the body that are readily observable without the use of magnification. Such cracks lead to reduced corrosion resistance of the electrode body to molten glass and can ultimately cause failure of the electrode. The presently disclosed compositions were the result of further research and the industrial-sized tin oxide-based electrode bodies formed according to compositions disclosed herein are free of macroscopic internal cracks.

EXAMPLE 1

Referring now to a comparative example, a series of compositions were prepared to form electrodes. The different compositions are presented in Table 1 below and include Samples A, B, C, and D, which are made from high-ZnO, prior art compositions. Samples E and F presented in Table 1 are made from low-ZnO compositions in accordance with embodiments herein. All of the samples were formed using the same process, notably including mixing of the compositions and molding via hot isostatic pressing followed by sintering at 1400° C. to 1500° C. for 40 hours and then cooled. Each of the samples formed large sample blocks having dimensions as indicated in Table 1.

TABLE 1

| Materials (wt %) | Sample A | Sample B | Sample C | Sample D | Sample E | Sample F |
| --- | --- | --- | --- | --- | --- | --- |
| SnO2 | 76.4 | 86.6 | 86.4 | 87.64 | 86.71 | 86.73 |
| CuO | 0.1 | 0.1 | 0.1 | 0.1 | 0.1 | 0.1 |
| ZnO | 0.5 | 0.3 | 0.5 | 0.21 | 0.19 | 0.17 |
| Sb2O3 | 1 | 1 | 1 | 1 | 1 | 1 |
| ZrO2 | 2 | 2 | 2 | 2 | 2 | 2 |
| Calcined Tin Oxide | 20 | 10 | 10 | 10 | 10 | 10 |
| Density (g/cc) | 6.63 | 6.49 | 6.51 | 6.69 | 6.71 | 6.71 |
| Apparent Porosity (vol %) | 0.6 | 1.49 | 0.19 | 0.23 | 0.23 | 0.79 |
| Sample final dimensions (in) | 4 × 10 × 12 | 4 × 10 × 12 | 4 × 10 × 12 | 5 × 13 × 20 | 5 × 13 × 20 | 5 × 13 × 20 |
| Cracked | Yes | Yes | Yes | Yes | No | No |

As illustrated by the data in Table 1 above, the density of Samples E and F produced from the low-ZnO compositions is superior to the density of the high-ZnO compositions (Samples A-D). The improved density improves the mechanical rigidity of the electrode body and also improves the corrosion resistance properties of the final-formed electrode body for improved lifetime. The density and porosity of each of the high-ZnO content samples (Samples A-D) were measured in areas without macroscopic internal cracks, and as such, it will be appreciated that the density would be less and apparent porosity would be greater if the measurements had taken the cracks into account.

Furthermore, despite the reduced content of ZnO in Samples E and F, which would lead one to believe that the bodies would not properly sinter and fully densify, the samples were capable of forming tin-oxide based bodies having particularly low apparent porosity. In fact, the low content ZnO compositions formed tin-oxide based bodies having porosities lower than bodies formed from compositions having more than twice as much ZnO. The densities and porosities noted above are particularly unexpected in light of the reduced content of sintering aids. It has been surmised by the inventors that excess contents of ZnO can result in the formation of gaseous species that evolve during formation which result in large internal pores and even macroscopic internal cracks.

Figure 5:
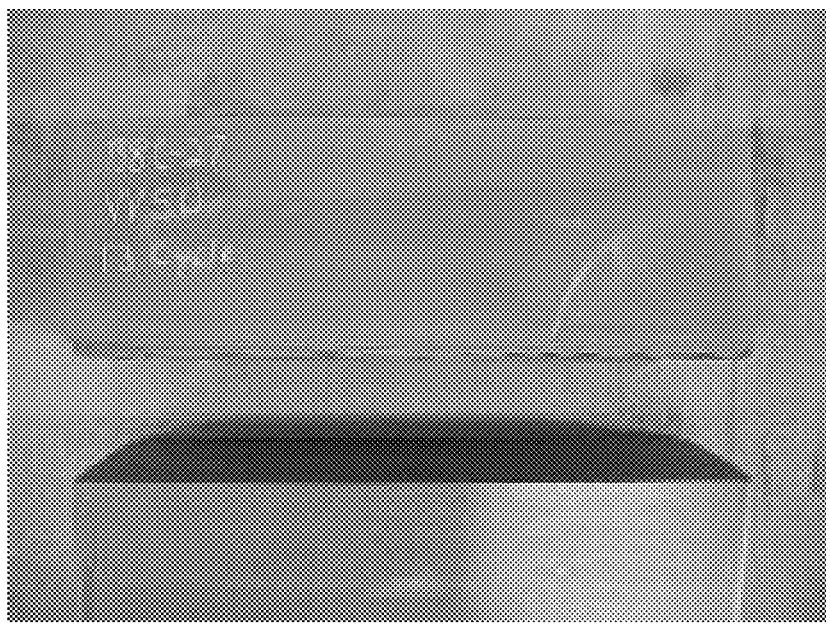
FIGS. 5-6 include photographs of cross-sections of industrial-sized sintered blocks for forming electrodes formed from compositions in accordance with embodiments.
Figure 6:
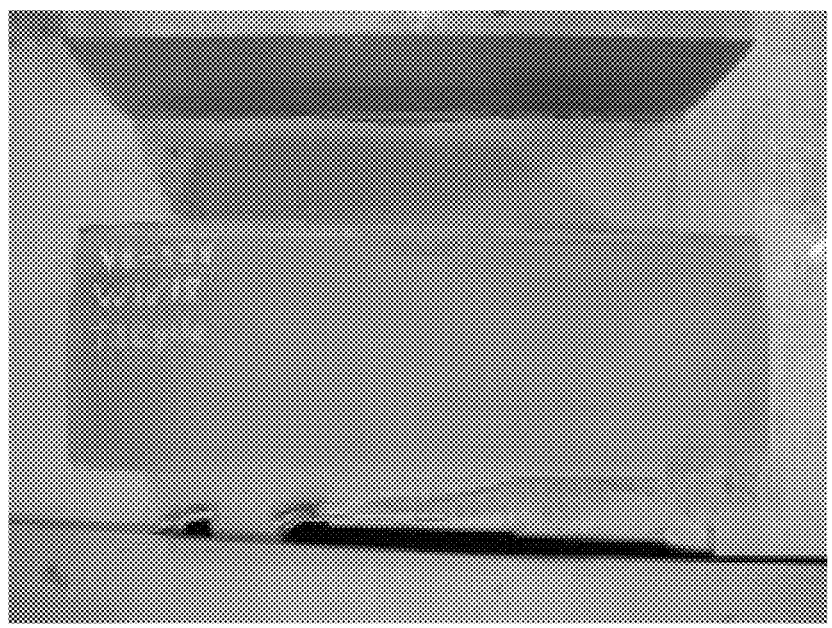

For evidence of such cracking, FIGS. 1-6 include photographs of cross-sections of the sintered sample blocks used to form industrial-sized electrodes. FIGS. 1-4 include photographs of the interior of Samples A-D made from the high-content ZnO composition after sectioning. FIGS. 5 and 6 include photographs of the Samples E and F, made from the low-content ZnO compositions after sectioning. As clearly illustrated, Samples A-D have macroscopic internal cracking that make the final formed tin oxide-based bodies unsuitable for forming electrodes. Such cracks can result in reduced corrosion resistance, poor thermal stability, and potentially poor electrical characteristics. By contrast, Samples E-F illustrated in FIGS. 5 and 6, despite having almost twice as much volume and less ZnO, demonstrate no macroscopic internal cracks. As such, in a direct comparison of the samples, the prior art composition is unsatisfactory for forming densified tin oxide-based bodies needed to form industrial-sized electrodes, while the compositions described herein formed densified tin oxide-based bodies suitable for forming industrial-size electrodes.

EXAMPLE 2

Two comparative samples were tested to determine if differences in the compositions resulted in changes in the electrical resistivity of the final-formed electrode bodies. The electrical resistivity of Samples A and E from Example 1 were tested at different temperatures ranging from 100° C. to 1000° C. to evaluate the change in electrical resistivity. As before, the electrical resistivity tests were conducted on areas of the samples without macroscopic internal cracks. The tests were performed using a 4-points probe method with direct current. Electrical resistance is collected through an analyzer Keithley 2750 every 100° C. from 100° C. to 1100° C., during both heating and cooling. Volume electrical resistivity was calculated using resistance data, the dimensions of the sample, and the position of the probes. Data reported in the present example is volume electrical resistivity measured during heating.

Figure 7:
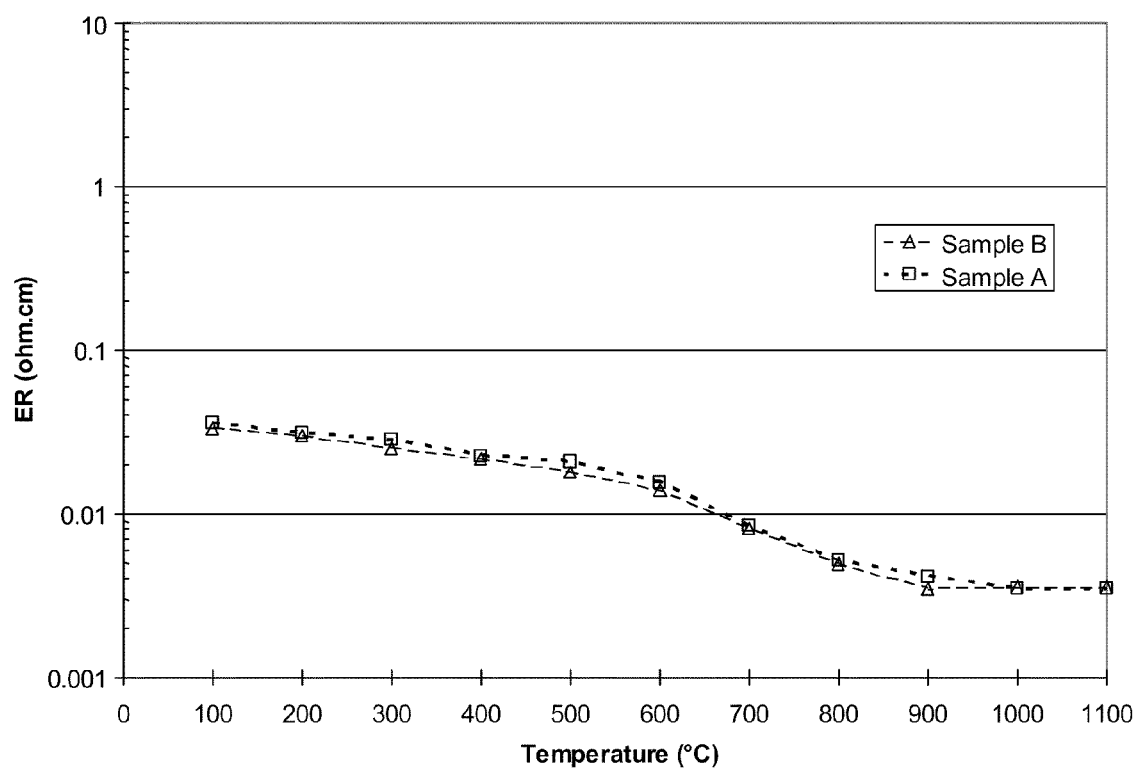
FIG. 7 includes two plots of electrical resistivity versus temperature for two samples, a conventional sample and a sample in accordance with an embodiment.

Referring to FIG. 7, two plots are illustrated on a graph of electrical resistivity versus temperature for Samples A and E described above. As illustrated, the electrical resistivity of the electrodes made from the compositions of Samples A and E are similar and quite suitable for use as industrial-grade electrodes. Accordingly, the plot of FIG. 7 demonstrates that the electrical resistivity of the electrode formed from the reduced ZnO composition of Sample E is suitable for use as an electrode and is not adversely affected by the change in composition.

Compositions used to form tin oxide-based electrodes is a mature art area and the effects of certain additives such as CuO and $Sb_2O_3$ have been well established. That is, typically CuO forms a liquid phase at high temperatures, and as such, during use of electrodes in high temperature glass furnace applications excessive contents of CuO have been known to reduce to $Cu_2O$ and Cu metal that can migrate causing voids within the electrode body thus subjecting the electrode to penetration by the molten glass resulting in corrosion and ultimately mechanical breakdown. Accordingly, it was suggested that particular ratios of additives including CuO, ZnO and $Sb_2O_3$ could be used to control the properties and characteristics of the final-formed electrode body. (See for example, U.S. 2006/0016223). In fact, such work was completed by an Inventor to this application. However, upon attempting to form industrial-sized samples (i.e., billets) it was discovered that such samples were subject to macroscopic internal cracking during the forming process. Upon noticing this problem, the inventors surmised that the content of ZnO may be associated with the macroscopic internal cracks. Without wishing to be tied to a particular theory, the inventors have identified that certain amounts of ZnO in excess of amounts useful for sintering of the tin oxide material tend to volatilize at high temperatures used during forming (e.g., temperatures above 1400° C.) that leave voids, which eventually lead to the formation of macroscopic internal cracks.

Accordingly, and as disclosed in the present specification, the inventors attempted to form a fully-densified, industrial-sized samples using reduced contents of CuO and ZnO, in combination with particular percentages of $Sb_2O_3$. The results, as provided in the examples demonstrate successful formation of tin-oxide based bodies that are dense and free of macroscopic internal cracks. Such densification is surprising given the reduced content of CuO and ZnO within the composition. Additionally, the resulting bodies formed from the compositions disclosed herein demonstrate suitable electrical resistivities for use as industrial-grade electrodes.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A tin oxide-based electrode formed from a composition comprising:
   a majority component comprising tin-oxide ($SnO_2$); and
   additives comprising CuO, ZnO, and a resistivity modifying species, wherein a total amount of CuO and ZnO is not greater than about 0.4 wt %, and wherein the ZnO is present in an amount within a range between about 0.1 wt % and about 0.19 wt %.

2. The tin oxide-based electrode of claim 1, wherein ZnO is present in an amount greater than an amount of CuO.

3. The tin oxide-based electrode of claim 1, wherein the total amount of CuO and ZnO is not greater than about 0.35 wt %.

4. The tin oxide-based electrode of claim 3, wherein the total amount of CuO and ZnO is within a range between about 0.25 wt % and about 0.3 wt %.

5. The tin oxide-based electrode of claim 1, wherein the additives comprise not greater than about 0.2 wt % CuO.

6. The tin oxide-based electrode of claim 1, wherein the additives comprise ZnO within a range between about 0.11 wt % and about 0.19 wt %.

7. The tin oxide-based electrode of claim 1, wherein the resistivity modifying species is selected from the group of materials consisting of $Sb_2O_3$, $As_2O_3$, $Nb_2O_5$, $Bi_2O_3$, and $Ta_2O_5$.

8. The tin oxide-based electrode of claim 1, wherein the resistivity modifying species is present in an amount within a range between about 0.5 wt % and about 1.5 wt %.

9. The tin oxide-based electrode of claim 1, further comprising an amount of $ZrO_2$ not greater than about 4 wt %.

10. The tin oxide-based electrode of claim 1, wherein the electrode has an electrical resistivity of not greater than about 0.1 ohm-cm at temperatures greater than about 100° C.

11. The tin oxide-based electrode of claim 1, wherein the electrode has a volume of at least about 10 $cm^3$.

12. A tin oxide-based electrode formed from a composition comprising:
  a majority component comprising tin-oxide ($SnO_2$); and
  additives comprising not greater than about 0.15 wt % CuO, ZnO within a range between about 0.1 wt % and about 0.19 wt %, and a resistivity modifying species within a range between about 0.5 wt % and about 1.5 wt %.

13. The tin oxide-based electrode of claim 12, wherein the additives comprise not greater than about 0.12 wt % CuO.

14. The tin oxide-based electrode of claim 12, wherein the additives comprise ZnO within a range between about 0.11 wt % and about 0.19 wt %.

15. The tin oxide-based electrode of claim 12, wherein the resistivity modifying species comprises $Sb_2O_3$.

16. The tin oxide-based electrode of claim 12, wherein the additives comprise about 1 wt % $Sb_2O_3$.

17. An electrode comprising:
  a tin oxide-based body having a rectangular cross-sectional contour and being free of macroscopic internal cracks, wherein the electrode is formed from a composition comprising:
    a majority component including tin-oxide ($SnO_2$); and
    additives comprising CuO, ZnO, and a resistivity modifying species, wherein CuO is present in an amount of less than about 0.2 wt % and ZnO is present in an amount within a range between about 0.1 wt % and about 0.19 wt %.

18. The electrode of claim 17, wherein the additives comprise not greater than about 0.15 wt % CuO.

19. The electrode of claim 17, wherein the ZnO is present in an amount within a range between about 0.11 wt % and about 0.19 wt %.

20. The electrode of claim 17, wherein the resistivity modifying species is present in an amount within a range between about 0.8 wt % and about 1.2 wt %.

* * * * *